United States Patent
Oda et al.

(10) Patent No.: US 12,400,018 B2
(45) Date of Patent: Aug. 26, 2025

(54) DATA DISTRIBUTION SYSTEM, DATA DISTRIBUTION DEVICE, RECORDING MEDIUM, AND DATA DISTRIBUTION METHOD

(71) Applicants: Kagoshima University, Kagoshima (JP); Ocean Solution Technology Kabushiki Kaisha, Nagasaki (JP)

(72) Inventors: Kentaro Oda, Kagoshima (JP); Yosuke Mizukami, Nagasaki (JP); Hiroyuki Nozaki, Kagoshima (JP)

(73) Assignees: Kagoshima University, Kagoshima (JP); Ocean Solution Technology Kabushiki Kaisha, Nagasaki (JP)

( * ) Notice: Subject to any disclaimer, the term of this patent is extended or adjusted under 35 U.S.C. 154(b) by 177 days.

(21) Appl. No.: 18/244,705

(22) Filed: Sep. 11, 2023

(65) Prior Publication Data
US 2024/0086565 A1    Mar. 14, 2024

(30) Foreign Application Priority Data
Sep. 14, 2022   (JP) ................. 2022-146069

(51) Int. Cl.
| | | |
|---|---|---|
| G06F 21/00 | (2013.01) | |
| G06F 16/21 | (2019.01) | |
| G06F 21/60 | (2013.01) | |
| G06F 21/62 | (2013.01) | |

(52) U.S. Cl.
CPC ........ *G06F 21/6227* (2013.01); *G06F 16/219* (2019.01); *G06F 21/602* (2013.01)

(58) Field of Classification Search
None
See application file for complete search history.

(56) References Cited

U.S. PATENT DOCUMENTS

| | | | |
|---|---|---|---|
| 2019/0361917 A1* | 11/2019 | Tran | H04W 12/108 |
| 2022/0337611 A1* | 10/2022 | Brazao | G06F 21/552 |
| 2023/0177149 A1* | 6/2023 | Ballantyne | G16H 40/60 |
| | | | 210/85 |

FOREIGN PATENT DOCUMENTS

JP    2017-204706 A    11/2017

* cited by examiner

*Primary Examiner* — Andrew J Steinle
(74) *Attorney, Agent, or Firm* — K&L Gates LLP; Brian J. Novak; Giorgios N. Kefallinos

(57) ABSTRACT

A data distribution device distributes a plurality of sets of data to a user one set of data at a time intermittently at intervals. Every time derived data obtained using the data are generated by the user, a registration device for user registers derived data generation history information indicating that the derived data are generated in a history management database. A derived data generation history information monitor examines whether or not derived data generation history information is registered in the history management database at a predetermined timing and, when no derived data generation history information is registered, suspends subsequent distribution of the data from the data distributor to the user.

14 Claims, 11 Drawing Sheets

FIG. 3

| | REGISTERED USER ID | REGISTERED PASSWORD | DISTRIBUTION PERMISSION INFORMATION |
|---|---|---|---|
| FIRST USER | | | |
| SECOND USER | | | |
| THIRD USER | | | |

111a  111b  111c

111

DATA DISTRIBUTION SYSTEM, DATA DISTRIBUTION DEVICE, RECORDING MEDIUM, AND DATA DISTRIBUTION METHOD

CROSS-REFERENCE TO RELATED APPLICATIONS

This application claims the benefit of Japanese Patent Application No. 2022-146069, filed on Sep. 14, 2022, the entire disclosure of which is incorporated by reference herein.

FIELD OF THE INVENTION

This application relates to a data distribution system, a data distribution device, a recording medium, and a data distribution method.

BACKGROUND OF THE INVENTION

As disclosed in Patent Literature 1 (Unexamined Japanese Patent Application Publication No. 2017-204706), a data distribution device that manages a history of distribution of data, using a history management database that is formed by a blockchain has been known.

The data distribution device, every time data are distributed, registers information obtained by appending an electronic signature of a provider who prepared the data to a hash value of the data and metadata accompanying the data in the history management database. In the metadata, information identifying the provider of the data, information identifying an acquirer of the data, and a date and time at which the data was generated are included.

In a method according to Patent Literature 1, the provider of the data cannot grasp whether or not distributed data are effectively made use of by the acquirer. In particular, there are some cases where when data are used for generation of derived data, such as a trained model, the provider desires to grasp whether or not the data are effectively made use of in order to prepare data with higher usability.

In addition, when there is little possibility that data are effectively made use of, it is desirable to suspend distribution of the data. This is because continuing uselessly distributing data that are not effectively made use of leads to an increase in the risk of leakage of the data. The present disclosure has been made in consideration of the above-described circumstances.

SUMMARY OF THE INVENTION

An objective of the present disclosure is to provide a technology capable of grasping whether or not distributed data are effectively made use of and suspending distribution of data that has a low possibility of being effectively made use of A data distribution system according to the present disclosure includes:
  a data distribution device including at least one processor to perform data distribution processing of distributing a plurality of sets of data that has contents different from one another to a user one set of the data at a time intermittently at intervals; and
  a registration device for user to, every time the data are distributed to the user in the data distribution processing and derived data that are obtained using the data are generated by the user, register derived data generation history information indicating that the derived data are generated by the user in a history management database for managing a history of use of the data,
  in which the at least one processor performs, at a predetermined timing, data distribution permission management processing of examining whether or not the derived data generation history information is registered in the history management database and, when the derived data generation history information is not registered in the history management database, suspending distribution of the data to the user in the data distribution processing.

The at least one processor included in the data distribution device may further perform, every time distribution of a set of the data to the user in the data distribution processing is finished, data distribution history information registration processing of registering data distribution history information indicating that distribution of the data to the user is finished in the history management database.

In the data distribution history information,
  provider identification information identifying a provider who prepared the data,
  acquirer identification information identifying an acquirer who is the user who received distribution of the data,
  data identification information identifying the data, and
  an electronic signature of the provider and an electronic signature of the acquirer for certifying that the data are distributed from the provider to the acquirer may be included.

The history management database may be achieved by a blockchain,
  the at least one processor may publish, in the data distribution history information registration processing, a transaction that requests verification that distribution of the data to the user is finished on the blockchain, and
  the published transaction may be verified by miners on the blockchain and a content of the verified transaction may be confirmed on the blockchain as the data distribution history information that is a non-fungible token by a smart contract stored on the blockchain.

In the derived data generation history information,
  generator identification information identifying a generator who is the user who generated the derived data,
  derived data identification information identifying the derived data,
  an electronic signature of the generator for certifying that the generator generated the derived data, and
  used data identification information identifying the data distribution history information indicating that the data used for generation of the derived data are distributed to the generator in the history management database may be included.

Using the data distributed to the user in the data distribution processing and parent derived data that are the derived data generated in a past, child derived data that are the derived data different from the parent derived data may be generated by the generator, and
  in the derived data generation history information related to the child derived data,
  parent derived data identification information identifying the derived data generation history information indicating that the parent derived data used for generation of the child derived data are generated in the history management database
  may be included.

The history management database may be achieved by a blockchain, the registration device for user may publish a transaction that requests verification that the derived data are generated by the user on the blockchain, and the published transaction may be verified by miners on the blockchain and a content of the verified transaction may be confirmed on the blockchain as the derived data generation history information that is a non-fungible token by a smart contract stored on the blockchain.

The history management database may be achieved by a blockchain, every time the derived data generated by the user are distributed to an outside, the registration device for user may publish a transaction that requests verification that distribution of the derived data is performed on the blockchain, and the published transaction may be verified by miners on the blockchain and a content of the verified transaction may be confirmed on the blockchain as the derived data distribution history information that is a non-fungible token by a smart contract stored on the blockchain.

The history management database may be achieved by a blockchain, the at least one processor may further perform, every time a set of the data is prepared by a provider in a state of being distributable to the user, data preparation history information registration processing of registering data preparation history information indicating that the data are prepared by the provider in the history management database, the at least one processor may publish, in the data preparation history information registration processing, a transaction that requests verification that the data are prepared by the provider on the blockchain, and the published transaction may be verified by miners on the blockchain and a content of the verified transaction may be confirmed on the blockchain as the data preparation history information that is a non-fungible token by a smart contract stored on the blockchain.

The at least one processor included in the data distribution device may further perform data processing execution processing of, by copying a common set of original data to a number of sets, the number being equal to a number of users, of the original data, preparing the original data for each of the users and, by subjecting each piece of the original data that are prepared for each of the users to data processing unique to the user, generating the data that are different with respect to each of the users, and in the data distribution processing, the data generated for each of the users in the data processing execution processing may be distributed to the corresponding user.

The at least one processor included in the data distribution device may further perform, when distribution of the data to the user in the data distribution processing is finished or when, from the user who generated the derived data using the data, sales report information indicating that the derived data are sold is acquired, charging processing of charging a price of the data to the user.

A data distribution device according to the present disclosure includes:

at least one processor to perform data distribution processing of distributing a plurality of sets of data that has contents different from one another to a user one set of the data at a time intermittently at intervals, and data distribution permission management processing of accessing a history management database that is a history management database for managing a history of use of the data and in which every time the data are distributed to the user in the data distribution processing and derived data that are obtained using the data are generated by the user, derived data generation history information indicating that the derived data are generated by the user is registered, in which the data distribution permission management processing includes examining, at a predetermined timing, whether or not the derived data generation history information is registered in the history management database and, when the derived data generation history information is not registered in the history management database, suspending distribution of the data to the user in the data distribution processing.

A non-transitory recording medium according to the present disclosure stores a data distribution program causing a computer to execute:

distributing a plurality of sets of data that has contents different from one another to a user one set of the data at a time intermittently at intervals; and accessing, at a predetermined timing, a history management database that is a history management database for managing a history of use of the data and in which every time the data are distributed to the user by a data distribution function and derived data that are obtained using the data are generated by the user, derived data generation history information indicating that the derived data are generated by the user is registered, examining whether or not the derived data generation history information is registered in the history management database, and, when the derived data generation history information is not registered in the history management database, suspending subsequent distribution of the data to the user by the data distribution function.

A data distribution method according to the present disclosure includes:

distributing, by a data distribution device, a plurality of sets of data that has contents different from one another to a user one set of the data at a time intermittently at intervals;

registering, by a registration device for user, every time the data are distributed from the data distribution device to the user and derived data that are obtained using the data are generated by the user, derived data generation history information indicating that the derived data are generated by the user in a history management database for managing a history of use of the data; and examining, by the data distribution device, at a predetermined timing, whether or not the derived data generation history information is registered in the history management database and, when the derived data generation history information is not registered in the history management database, suspending subsequent distribution of the data to the user.

BRIEF DESCRIPTION OF DRAWINGS

A more complete understanding of this application can be obtained when the following detailed description is considered in conjunction with the following drawings, in which:

FIG. 3 is a conceptual diagram illustrating a configuration of a distribution destination management table according to Embodiment 1;

DETAILED DESCRIPTION OF THE INVENTION

Figure 1:
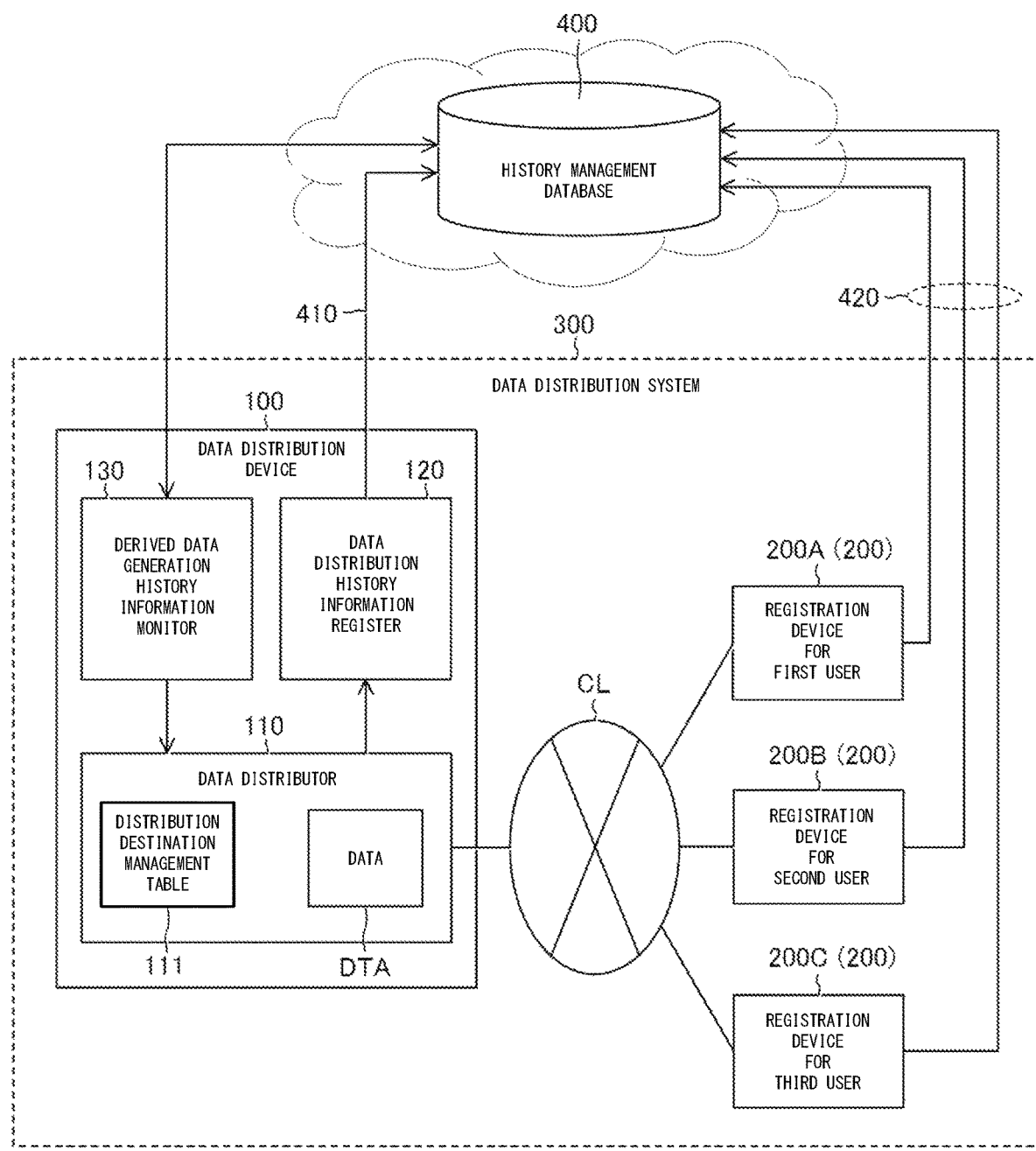
FIG. 1 is a conceptual diagram illustrating a configuration of a data distribution system according to Embodiment 1.

Hereinafter, with reference to the drawings, data distribution systems according to embodiments are described. In the drawings, the same or corresponding constituent elements are designated by the same reference numerals.

Embodiment 1

As illustrated in FIG. 1, a data distribution system 300 according to the present embodiment includes a data distribution device 100 to distribute data DTA that are used as a resource to generate derived data and a registration device 200A for first user, a registration device 200B for second user, and a registration device 200C for third user each of which is connected to the data distribution device 100 via a communication line CL The data distribution device 100 is owned by a provider who prepares and provides data DTA. Even when a person who prepares data DTA and a person who provides prepared data DTA are different, the persons are collectively referred to as a provider.

The registration device 200A for first user, the registration device 200B for second user, and the registration device 200C for third user are owned by a first user, a second user, and a third user each of whom is provided with data DTA from the provider by distribution, respectively. Each of the first user, the second user, and the third user generates derived data, using data DTA acquired from the provider.

In the present embodiment, data DTA are measurement data representing a result of measurement of a target object, such as an environment, an object, and a living body, of the ocean or the like and are subjected to processing, analysis, integration, and the like for the purpose of generating derived data. That is, derived data mean data obtained based on data DTA, and specifically mean data obtained by using the data DTA as a resource and subjecting the data DTA to processing, analysis, integration, and the like. In a concept of derived data, a software program is also included.

Figure 2:
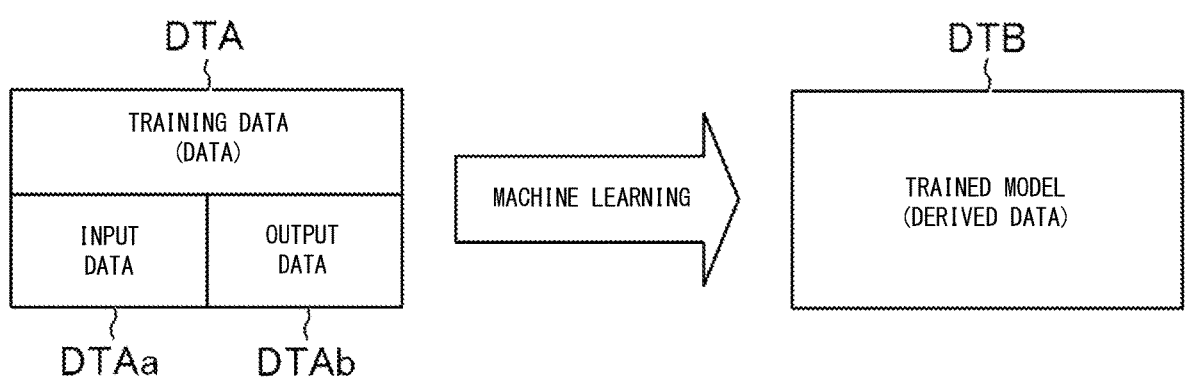
FIG. 2 is a conceptual diagram illustrating a relationship between data and derived data according to Embodiment 1.

With reference to FIG. 2, a specific example of data DTA and derived data is described below.

As illustrated in FIG. 2, derived data DTB are specifically a trained model. Training data used for generation of the trained model are the above-described data DTA. That is, each of the first to third users generates derived data DTB serving as a trained model by supervised machine learning using data DTA acquired from the provider as training data. Note that, for machine learning, a known algorithm, such as a neural network, can be used.

The data DTA serving as training data include input data DTAa and output data DTAb that have a correlation with each other.

The input data DTAa are data representing ocean conditions at the time of fishing. Specifically, in data relating to ocean conditions, data representing a geographical point at which fishing was performed, data representing ocean temperature at the point, data representing an ocean current at the point, data representing salinity of seawater at the point, data representing a tide and the age of the moon at a point in time at which the fishing was performed, and the like are included.

The output data DTAb are data representing fish catch when fishing is performed under ocean conditions that corresponding input data DTAa represent.

The provider acquires the above-described input data DTAa and output data DTAb in the course of fishing, using a fishing boat equipped with observation equipment for observing ocean conditions. The data DTA including such input data DTAa and output data DTAb are used as training data. Because of this configuration, when data relating to ocean conditions are input, derived data DTB serving as a trained model that outputs an estimated value of fish catch under the ocean conditions are obtained.

Retuning to FIG. 1, the description is continued. The data distribution device 100 includes a data distributor 110 to perform data distribution processing of distributing the above-described data DTA. The data distributor 110 distributes a plurality of sets of data DTA that has contents different from one another and constitutes a group of data that are continuously generated (hereinafter, referred to as a streaming data group) to each of the first to third users one set of data DTA at a time intermittently at intervals.

As used herein, "intermittently at intervals" does not necessarily have to mean that the distribution is performed periodically and, in the present embodiment, is assumed to mean "at intervals of one to several days". That is, the provider goes fishing by a fishing boat equipped with observation equipment for observing ocean conditions at intervals of one to several days and, every time going fishing, obtains a set of data DTA serving as the above-described training data, using the observation equipment. The provider prepares a new set of data DTA having a content different from that of the last data DTA at intervals of one to several days in this way. Every time the provider prepares a new set of data DTA, the provider distributes the set of data DTA to the first to third users through the data distributor 110.

When the first user is to acquire data DTA distributed by the data distributor 110, the first user accesses the data distributor 110, using the registration device 200A for first user via the communication line CL.

Then, the data distributor 110 causes the registration device 200A for first user to display a screen requesting input of information, specifically, a user ID and a password of the first user, for confirming that the user is the first user himself/herself. In the screen, the first user inputs the user ID and the password of the first user, using the registration device 200A for first user.

When the data distributor 110 confirms that the user is the first user himself/herself by the input user ID and password, the data distributor 110 permits download of the data DTA by the first user. Subsequently, the first user begins generation of derived data DTB, using the data DTA downloaded from the data distributor 110.

The second user and the third user also download the data DTA, using the registration device 200B for second user and the registration device 200C for third user, respectively and generate derived data DTB, using the downloaded data DTA in a similar manner.

The data distributor 110 includes a distribution destination management table 111 in order to confirm a distribution destination in the distribution of data DTA described above. With reference to FIG. 3, a configuration of the distribution destination management table 111 is described below.

As illustrated in FIG. 3, the distribution destination management table 111 is data in which, with respect to each of the first to third users, a registered user ID 111a identifying the user, a registered password 111b proving that the user is authentic, and distribution permission information 111c are associated with one another. The registered user ID 111a and the registered password 111b are registered in advance before distribution of data DTA.

The data distributor 110 is capable of confirming that a person who accessed the data distributor 110 is one of the first to third users by confirming that a combination of the user ID and the password that are transmitted to the data distributor 110 coincides with a combination of the registered user ID 111a and the registered password 111b that are registered in the distribution destination management table 111. Note that the distribution permission information 111c is described later.

Returning to FIG. 1, the description is continued. The data distribution device 100 also includes a data distribution history information register 120 to perform, every time distribution of a set of data DTA is finished in a manner described above, data distribution history information registration processing of registering the distribution in a history management database 400.

The history management database 400 is a database for managing a history of use of data DTA.

The history management database 400 may be a public database that is managed by a specific third party other than the provider and the first to third users of data DTA. In that case, the history management database 400 is maintained by a server, the server being owned by the specific third party, other than the data distribution device 100, the registration device 200A for first user, the registration device 200B for second user, and the registration device 200C for third user.

In addition, the history management database 400 may be a database that is shared in a distributed manner by a plurality of nodes participating in a not-illustrated network, specifically, a blockchain. In that case, in the concept of nodes, the data distribution device 100, the registration device 200A for first user, the registration device 200B for second user, and the registration device 200C for third user can be included.

Specifically, every time distribution of a set of data DTA from the data distributor 110 to one user of the first user, the second user, and the third user is finished, the data distribution history information register 120 registers data distribution history information 410 serving as a proof indicating that the distribution of the data DTA to the user is finished in the history management database 400.

When data distribution history information 410 is registered in the history management database 400 by the data distribution history information register 120, information identifying the data distribution history information 410 in the history management database 400 (hereinafter, referred to as a data distribution history information registration ID) is provided to the data distribution history information 410. In other words, the data distribution history information 410 is registered in the history management database 400 in conjunction with the data distribution history information registration ID.

In the data distribution history information 410, the following information (A) to (E) is included. Note that, hereinafter, the first user, the second user, and the third user are collectively referred to as "user".

(A) Provider identification information identifying a provider who prepared the data DTA. Examples of the provider identification information include a user ID of the provider. The provider identification information causes who prepared the data DTA to be clearly identifiable.

(B) Acquirer identification information identifying an acquirer who is a user who received distribution of the data DTA. Examples of the acquirer identification information include a user ID of the acquirer. The acquirer identification information causes who acquired the data DTA to be clearly identifiable.

(C) Data identification information identifying the data DTA distributed from the provider to the acquirer. As the data identification information, for example, at least one of the following information (C1) to (C3) can be used.

(C1) A hash value of the data DTA.

(C2) Access location information representing an access location in a network of the data DTA or encrypted data DTA. The access location information is, for example, a URL. When the data DTA are encrypted, authentication information, such as an access key and a password, for confirming a content of the data DTA is preferably appended to the encrypted data DTA.

(C3) Encrypted data DTA themselves. In this case, authentication information for confirming a content of the encrypted data DTA is preferably appended to the encrypted data DTA.

In addition, as the data identification information (C), in addition to at least one of the above-described information (C1) to (C3), at least either the following information (C4) or (C5) may be used.

(C4) Data description information describing the content of the data DTA. Examples of the data description information include a text data describing the content of the data DTA in a natural language.

(C5) Information representing an identifier representing a form of the data DTA. Examples of the information representing an identifier include information representing a media type.

(D) Data distribution date/time information identifying a date and time at which the data DTA was distributed from the provider to the acquirer. Examples of the data distribution date/time information include a time stamp.

(E) Last data identification information identifying data distribution history information 410 related to a last set of data DTA that was distributed in the last distribution before the distribution of the set of data DTA in the history management database 400. As the last data identification information, the data distribution history information registration ID of the last set of data DTA is used.

As already described, a group of a plurality of sets of data DTA that the data distributor 110 intermittently provides constitutes one streaming data group. Thus, it is useful when pieces of data distribution history information 410 related to pieces of data DTA constituting a common streaming data group are associated with one another in the history management database 400. Therefore, the last data identification information is also included in the data distribution history information 410.

(F) An electronic signature of the provider and an electronic signature of the acquirer for certifying that the data DTA are provided from the provider to the acquirer. The electronic signatures represent a mutual agreement between the provider and the acquirer with respect to contents of information including the above-described (A) to (E) (hereinafter, referred to as data distribution confirmation information).

Figure 4:
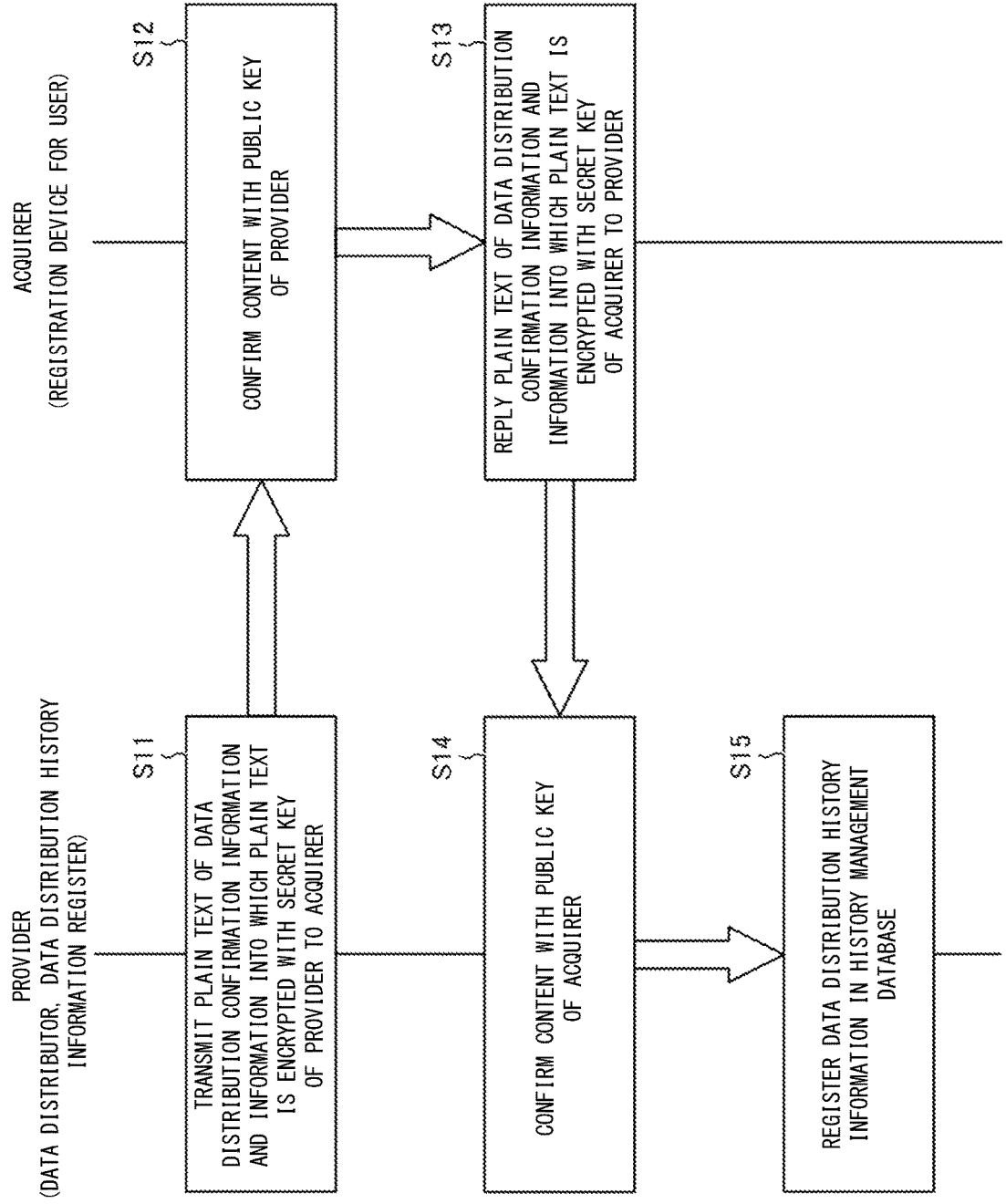
FIG. 4 is a flowchart illustrating a generation process of data distribution history information according to Embodiment 1.

With reference to FIG. 4, a process of obtaining the electronic signature of the provider and the electronic signature of the acquirer is described below. In a specific example described below, the electronic signatures are formed using a public key cryptosystem. As a prerequisite, it is assumed that the acquirer has, in addition to a secret key of the acquirer himself/herself, a public key of the provider in advance. Likewise, it is assumed that the provider has, in addition to a secret key of the provider himself/herself, a public key of the acquirer in advance.

As illustrated in FIG. 4, the provider first transmits a plain text representing data distribution confirmation information including the already described information (A) to (E) and first encrypted data distribution confirmation information into which the plain text is encrypted with the secret key of the provider to the acquirer (step S11). The first encrypted data distribution confirmation information is equivalent to the electronic signature of the provider.

Note that the encryption and transmission in step S11 are performed by the data distributor 110. A transmission destination is a registration device among the registration devices 200A to 200C for first to third users that the acquirer owns (hereinafter, referred to as a registration device 200 for user).

Next, the acquirer confirms the information transmitted by the provider, using the public key of the provider (step S12). Specifically, the acquirer confirms a content of the plain text representing the above-described data distribution confirmation information and confirms whether or not a hash value of the plain text coincides with a hash value of information into which the above-described first encrypted data distribution confirmation information is decrypted with the public key of the provider. Note that operation in step S12, that is, the calculation of a hash value, the confirmation of coincidence between the hash values, and the decryption of the first encrypted data distribution confirmation information, is performed by the registration device 200 for user.

When the hash values are confirmed to coincide with each other, the acquirer replies the plain text representing the data distribution confirmation information and second encrypted data distribution confirmation information into which the plain text is encrypted with the secret key of the acquirer himself/herself to the provider (step S13). The second encrypted data distribution confirmation information is equivalent to the electronic signature of the acquirer. Note that the reply in step S13 is performed by the registration device 200 for user.

Next, the provider confirms the information replied by the acquirer, using the public key of the acquirer (step S14). Specifically, the provider confirms a content of the plain text representing the above-described data distribution confirmation information and confirms whether or not a hash value of the plain text coincides with a hash value of information into which the above-described second encrypted data distribution confirmation information is decrypted with the public key of the acquirer. Note that the operation in step S14, that is, the calculation of a hash value, the confirmation of coincidence between the hash values, and the decryption of the second encrypted data distribution confirmation information, is performed by the data distributor 110.

When the hash values are confirmed to coincide with each other, the provider registers the data distribution history information 410 including the electronic signature of the provider himself/herself formed by the first encrypted data distribution confirmation information and generated in step S11, the electronic signature of the acquirer formed by the second encrypted data distribution confirmation information and acquired in step S14, and the above-described data distribution confirmation information in the history management database 400 (step S15).

As already described, the data distribution history information 410 is registered in the history management database 400 in conjunction with the data distribution history information registration ID for identifying the data distribution history information 410 in the history management database 400. Note that the registration is performed by the data distribution history information register 120.

Retuning to FIG. 1, the description is continued. While the data distribution history information 410 is registered in the history management database 400 by the data distribution history information register 120 in a manner as described above, the acquirer who received distribution of a set of data DTA from the data distributor 110 generates the already described derived data DTB, using the set of data DTA.

Note that, for the generation of the derived data DTB, the registration device 200 for user that the acquirer owns may be used or a device different from the registration device 200 for user may be used.

Every time a set of data DTA is distributed from the data distributor 110 to an acquirer and derived data DTB that are obtained using the set of data DTA are generated by the acquirer in a manner as described above, the registration device 200 for user registers derived data generation history information 420 serving as a proof indicating that the derived data DTB are generated in the history management database 400.

In the derived data generation history information 420, the following information (a) to (e) is included.

(a) Generator identification information identifying a generator who is the acquirer who generated the derived data DTB. Examples of the generator identification information include a user ID of the generator. The generator identification information causes who generated the derived data DTB to be clearly identifiable.

(b) Derived data identification information identifying the generated derived data DTB. As the derived data identification information, for example, at least one of the following information (b1) to (b3) can be used.

(b1) A hash value of the derived data DTB.

(b2) Access location information representing an access location in the network of the derived data DTB or encrypted derived data DTB. The access location information is, for example, a URL. When the derived data DTB are encrypted, authentication information, such as an access key and a password, for confirming a content of the derived data DTB is preferably appended to the encrypted derived data DTB.

(b3) Encrypted derived data DTB themselves. In this case, authentication information for confirming a content of the encrypted derived data DTB is preferably appended to the encrypted derived data DTB.

In addition, as the derived data identification information (b), in addition to at least one of the above-described information (b1) to (b3), at least either the following information (b4) or (b5) may be used.

(b4) Derived data description information describing the content of the derived data DTB. Examples of the derived data description information include a text data describing the content of the derived data DTB in a natural language.

(b5) Information representing an identifier representing a form of the derived data DTB. Examples of the information representing an identifier include information representing a media type.

(c) Derived data generation date/time information identifying a date and time at which the derived data DTB was generated. Examples of the derived data generation date/time information include a time stamp.

(d) An electronic signature of the generator for certifying that the generator generated the derived data DTB. The electronic signature represents an approval by the generator himself/herself with respect to a content of information including the above-described (a) to (c) (hereinafter, referred to as derived data generation confirmation information). Specifically, as the electronic signature of the generator, encrypted derived data generation confirmation information into which a plain text representing the derived data generation confirmation information is encrypted with a secret key of the generator can be used.

(e) Used data identification information identifying data distribution history information 410 representing a proof indicating that data DTA used for generation of the derived data DTB is distributed to the generator in the history management database 400. As the used data identification information, the already described data distribution history information registration ID related to data DTA used for the generation of the derived data DTB is used.

When the derived data generation history information 420 described above is registered in the history management database 400 by the registration device 200 for user, information identifying the derived data generation history information 420 in the history management database 400 (hereinafter, referred to as a derived data generation history information registration ID) is provided to the derived data generation history information 420. In other words, the derived data generation history information 420 is registered in the history management database 400 in conjunction with the derived data generation history information registration ID.

In addition, there is a case where, using data DTA acquired in the current distribution and derived data DTB that were generated in the past (hereinafter, referred to as parent derived data), derived data DTB that are different from the parent derived data (hereinafter, referred to as child derived data) are generated by the generator.

For example, such a case is a case where, by further training a trained model serving as parent derived data, using data DTA acquired in the current distribution as training data, child derived data serving as an updated trained model are obtained. In such a case, it is assumed that, in the derived data generation history information 420 related to the child derived data, the following information (f) is further included.

(f) Parent derived data identification information identifying the derived data generation history information 420 indicating that the parent derived data used for generation of the child derived data are generated in the history management database 400.

This configuration causes pieces of derived data generation history information 420 related to a plurality of pieces of derived data DTB linked by a parent-child relationship to be associated with each other in the history management database 400. As used herein, "a plurality of pieces of derived data DTB linked by a parent-child relationship" means that the plurality of pieces of derived data DTB include not only child derived data when some derived data are considered as parent derived data but also grandchild derived data that are child derived data when the child derived data are considered as parent derived data and further include great-grandchild derived data that are child derived data when the grandchild derived data are considered as parent derived data, and the like.

Figure 5:
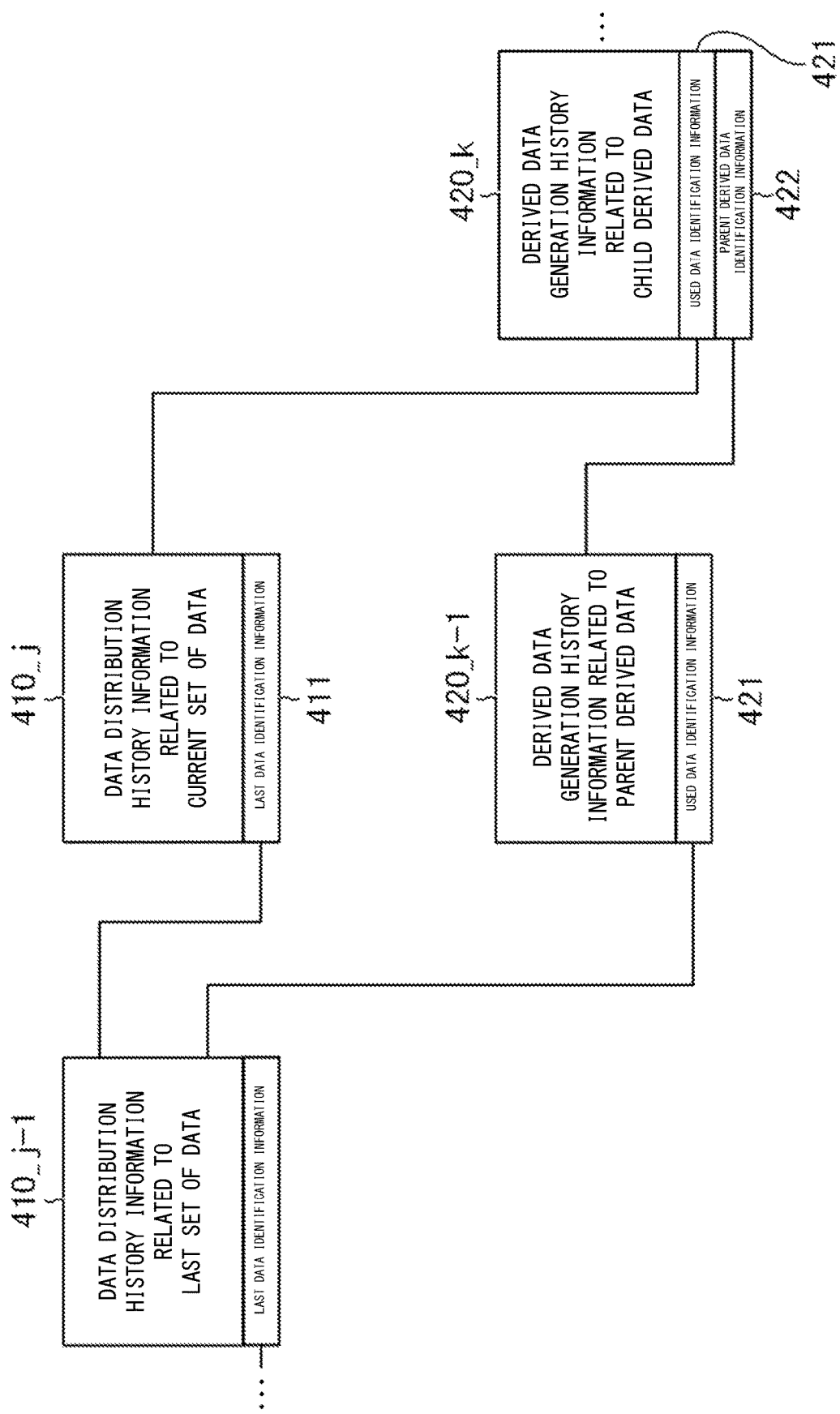
FIG. 5 is a conceptual diagram illustrating links between data distribution history information and derived data generation history information in a history management database according to Embodiment 1.

With reference to FIG. 5, a form of association between the data distribution history information 410 and the derived data generation history information 420 in the history management database 400 is described below.

As illustrated in FIG. 5, first, in data distribution history information $410\_j$ related to a current set of data DTA, a data distribution history information registration ID 411 that identifies data distribution history information $410\_j-1$ related to a last set of data DTA and serves as the already described last data identification information (E) is included. Because of this configuration, it becomes clear that the current set of data DTA and the last set of data DTA constitute a common streaming data group.

In addition, in each of derived data generation history information $420\_k-1$ related to parent derived data and derived data generation history information $420\_k$ related to child derived data, a data distribution history information registration ID 421 that identifies data distribution history information 410 related to data DTA used for generation of the derived data and serves as the already described used data identification information (e) is included.

In addition, in the derived data generation history information $420\_k$ related to the child derived data, a data distribution history information registration ID 422 that identifies the derived data generation history information $420\_k-1$ related to the parent derived data used for generation of the child derived data and serves as the already described parent derived data identification information (f) is also included. In this way, a plurality of pieces of derived data DTB linked by a parent-child relationship is clearly associated with each other.

Retuning to FIG. 1, the description is continued. As described in the foregoing, a user receives distribution of data DTA from the data distributor 110 through a registration device 200 for user. Every time derived data DTB are generated by the user, the registration device 200 for user registers derived data generation history information 420 certifying that the user generated the derived data DTB in the history management database 400.

On the other hand, the data distribution device 100 also includes a derived data generation history information monitor 130 to perform data distribution permission management processing of managing permission of distribution of data DTA to a user.

The data distribution permission management processing is processing of, at a predetermined timing, examining whether or not derived data generation history information 420 is registered in the history management database 400 and, when no derived data generation history information 420 is registered in the history management database 400, suspending subsequent distribution of data DTA from the data distributor 110 to the user.

Figure 6:
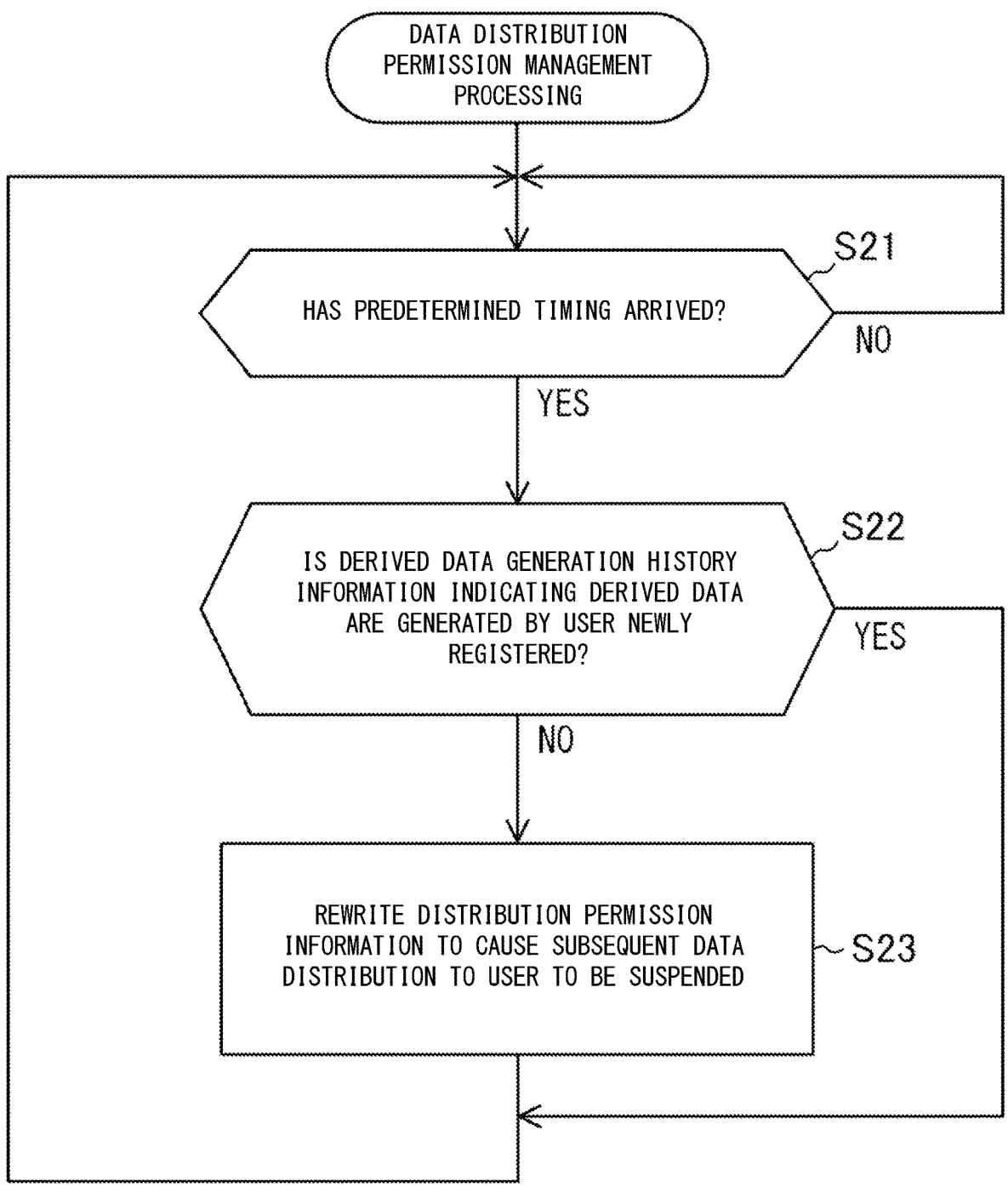
FIG. 6 is a flowchart illustrating data distribution permission management processing according to Embodiment 1.

With reference to FIG. 6, the data distribution permission management processing performed by the derived data generation history information monitor 130 is specifically described below.

As illustrated in FIG. 6, first, the derived data generation history information monitor 130 determines whether or not a predetermined timing for confirming that derived data generation history information 420 has been registered has arrived (step S21). When the predetermined timing has not arrived (step S21; NO), the derived data generation history information monitor 130 returns to step S21 again.

As used herein, the "predetermined timing" is assumed, in the present embodiment, to be a point in time at which a predetermined period (hereinafter, referred to as a period required for derived data generation) has elapsed measured from a point in time at which distribution of data DTA to a user by the data distributor 110 is finished most recently.

As already described, a streaming data group is intermittently distributed one set of data DTA at a time by the data distributor 110. A time interval between distribution of a set of data DTA and distribution of a next set of data DTA is referred to as a data distribution interval. The above-described period required for derived data generation is shorter than the data distribution interval. Specifically, in the present embodiment, it is assumed that the period required for derived data generation is one day.

When the above-described predetermined timing has arrived (step S21; YES), the derived data generation history information monitor 130 accesses the history management database 400 and examines whether or not a new registration of derived data generation history information 420 indicating that derived data DTB are generated by the user is performed in the history management database 400 (step S22).

As used herein, the "new registration" means registration of derived data generation history information 420 indicating that derived data DTB based on data DTA that was distributed to the user most recently are generated. In other words, the determination in step S22 is equivalent to an operation to confirm whether or not the data DTA that was distributed to the user most recently is appropriately made use of for generation of derived data DTB by the user.

When no new registration of derived data generation history information 420 in the history management database 400 is performed (step S22; NO), the derived data generation history information monitor 130 suspends subsequent distribution of the data DTA to the user from the data distributor 110 since the data DTA that was distributed to the user most recently is not made use of for generation of derived data DTB (step S23).

With reference to FIG. 3, the processing in step S23 is specifically described. The distribution destination management table 111 illustrated in FIG. 3 is, as already described, a table for the data distributor 110 to authenticate whether or not a person who accessed the data distributor 110 to request distribution of data DTA is an authentic user.

In the distribution destination management table 111, not only a registered user ID 111a and a registered password 111b that are information to be used for authentication of a user but also distribution permission information 111c that is information indicating whether or not distribution of data DTA to the user is permitted is stored.

The data distributor 110, after authenticating a user, based on a registered user ID 111a and a registered password 111b, distributes data DTA to the user only when the distribution permission information 111c indicates that distribution of the data DTA to the user is permitted. When the distribution permission information 111c indicates that distribution of data DTA to the user is prohibited, the data distributor 110 does not perform distribution of the data DTA to the user.

It is assumed that information indicating that distribution of data DTA to users is permitted is stored as the distribution permission information 111c in advance. The distribution permission information 111c is rewritten by the derived data generation history information monitor 130.

That is, in the above-described step S23, the derived data generation history information monitor 130 rewrites distribution permission information 111c related to a user to a content prohibiting distribution of data DTA to the user. Through this processing, distribution of data DTA from the data distributor 110 to the user is suspended after the rewriting.

Retuning to FIG. 6, the description is continued. The derived data generation history information monitor 130, after rewriting the distribution permission information 111c in step S23, returns to step S21 again.

In addition, when, in step S22, a new registration of derived data generation history information 420 in the history management database 400 is performed (step S22; YES), the derived data generation history information monitor 130 returns to step S21 again without rewriting the distribution permission information 111c since data DTA that was distributed to the user most recently is made use of for generation of derived data DTB.

Figure 7:
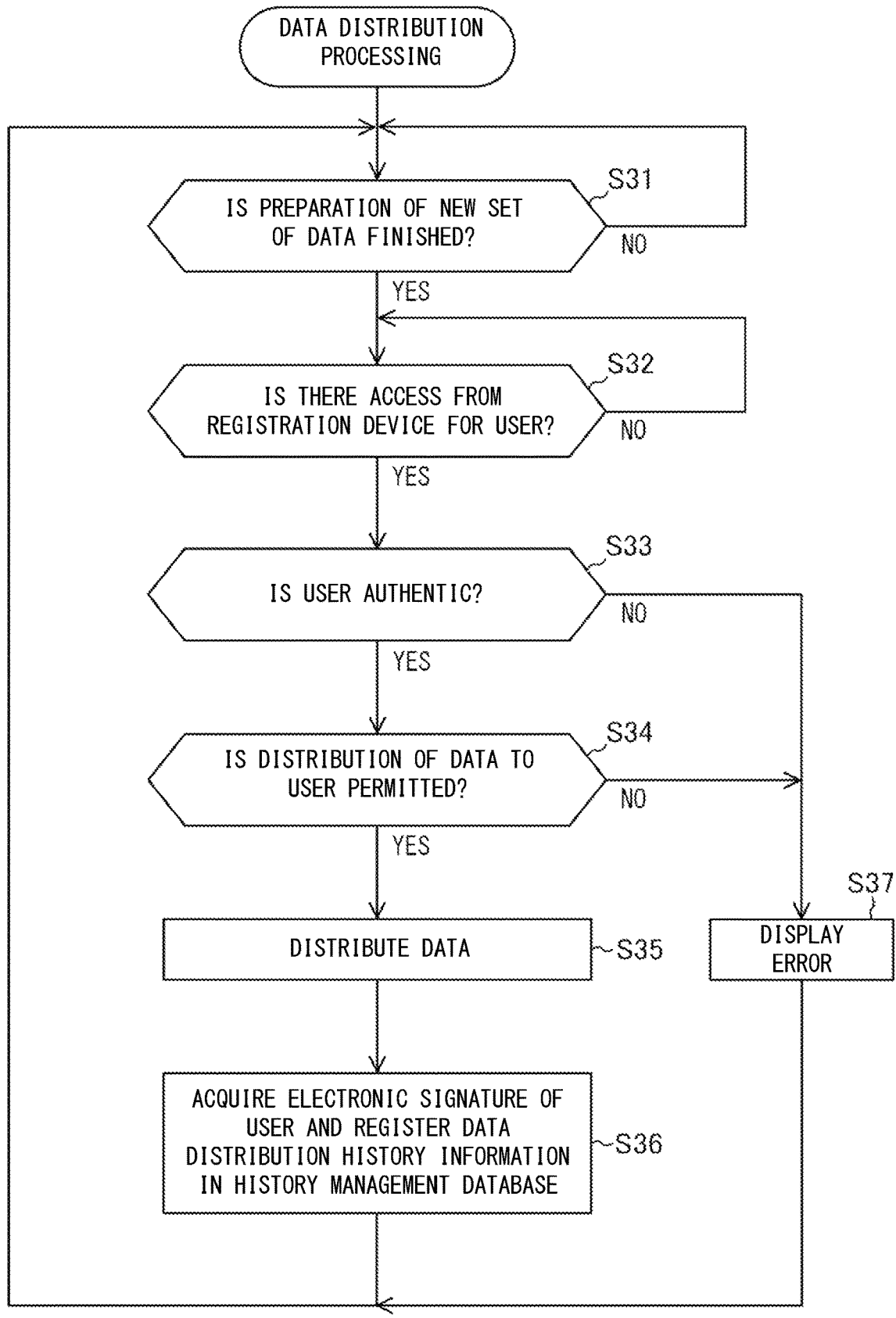
FIG. 7 is a flowchart illustrating data distribution processing according to Embodiment 1.

Succeedingly, with reference to FIG. 7, data distribution processing performed by the data distributor 110 and the data distribution history information register 120 is described.

As illustrated in FIG. 7, when the already described data distribution interval has elapsed since distribution of a last set of data DTA was finished and a new next set of data DTA is prepared by the provider (step S31; YES), the data distributor 110 determines whether or not there is access from a user using a registration device 200 for user to the data distributor 110 (step S32).

When there is access from a user using a registration device 200 for user (step S32; YES), the data distributor 110 first determines whether or not the user is authentic (step S33). Specifically, the data distributor 110 determines whether or not a user ID and a password that the user input using the registration device 200 for user and a registered user ID 111a and a registered password 111b that are stored in the distribution destination management table 111 in advance coincide with each other, respectively.

Next, when the data distributor 110 confirms that the user is authentic (step S33; YES), the data distributor 110 determines whether or not distribution of data to the user is permitted (step S34). Specifically, the data distributor 110 determines whether or not the distribution permission information 111c stored in the distribution destination management table 111 indicates that distribution of data DTA to the user is permitted.

Only when the distribution permission information 111c indicates that distribution of data DTA to the user is permitted (step S34; YES), the data distributor 110 distributes data DTA to the user (step S35). That is, the data distributor 110 permits download of data DTA to the registration device 200 for user of the user.

Next, the data distributor 110, after acquiring an electronic signature from the user in a manner described with reference to FIG. 4, registers data distribution history information 410 indicating that distribution of data DTA to the user is finished in the history management database 400 (step S36). Subsequently, the data distributor 110 returns to step S31 again.

In addition, when the user is not confirmed to be authentic in step S33 (step S33; NO), the data distributor 110 causes the registration device 200 for user to display an error message since the data distributor 110 cannot perform distribution of data DTA to the person (step S37) and returns to step S31.

In addition, when the distribution permission information 111c indicates that distribution of data DTA to the user is prohibited in step S34 (step S34; NO), the data distributor 110 also causes the registration device 200 for user to display an error message since the data distributor 110 cannot perform distribution of data DTA to the person (step S37) and returns to step S31.

The functions of the data distribution device 100 was described above. Finally, with reference to FIG. 8, a hardware configuration of the data distribution device 100 is described.

Figure 8:
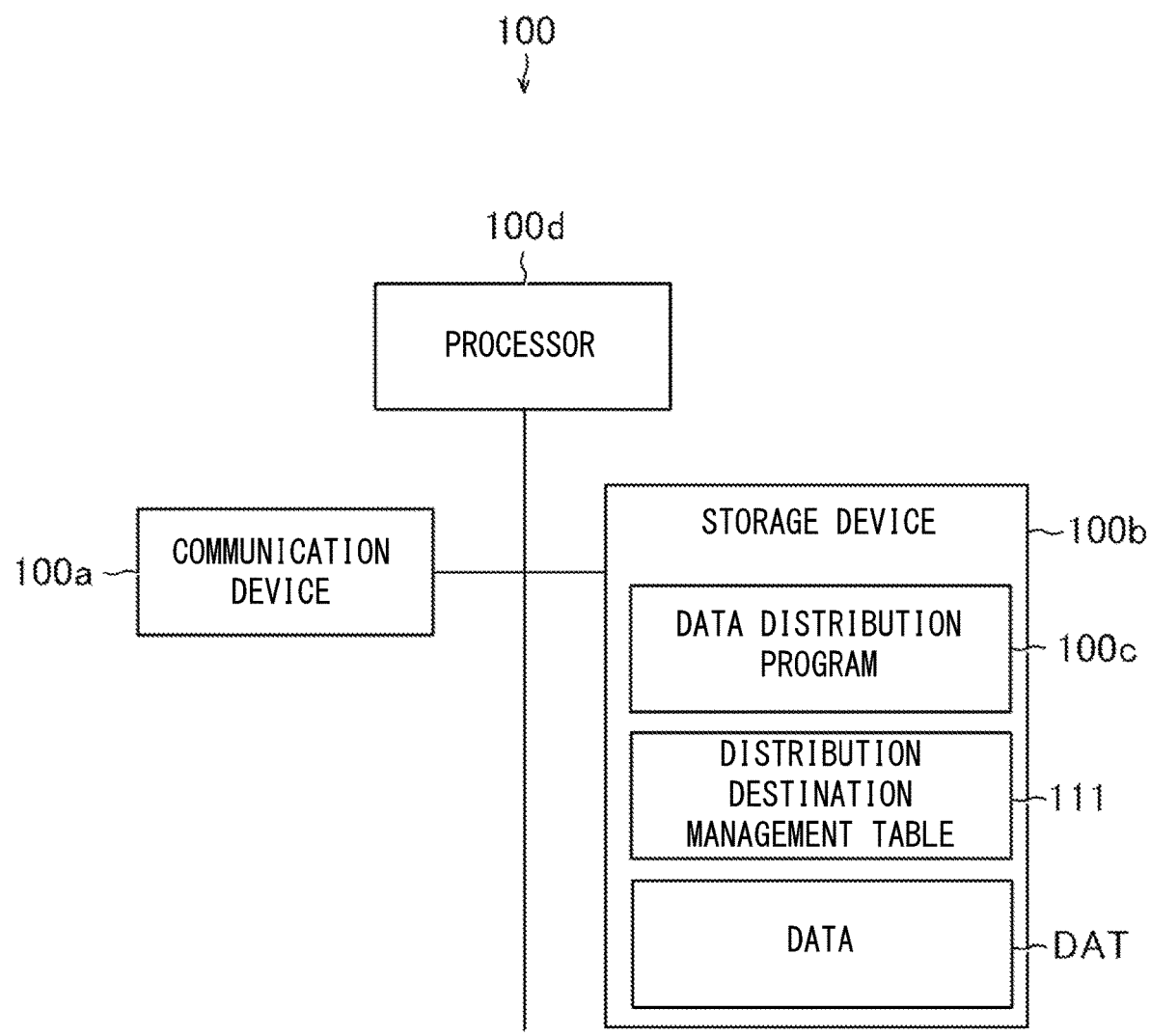
FIG. 8 is a conceptual diagram illustrating a configuration of a data distribution device according to Embodiment 1.

As illustrated in FIG. 8, the data distribution device 100 includes a communication device 100a in charge of communication with an external device. Specifically, the communication device 100a is in charge of communication with the registration devices 200 for user and access to the history management database 400, illustrated in FIG. 1.

The data distribution device 100 also includes a storage device 100b to store the already described distribution destination management table 111 and data DTA. By the provider, a new set of data DTA is prepared in the storage device 100b at every already described data distribution interval. In this way, a new set of data DTA is uploaded to the storage device 100b at every data distribution interval. In addition, in the storage device 100b, a data distribution program 100c that defines the functions of the data distribution device 100 is also stored.

The data distribution device 100 also includes a processor 100d to execute the data distribution program 100c. The processor 100d executing the data distribution program 100c enables the functions of the data distributor 110, the data distribution history information register 120, and the derived data generation history information monitor 130 illustrated in FIG. 1 and in particular the data distribution permission management processing illustrated in FIG. 6 and the data distribution processing illustrated in FIG. 7 to be achieved.

Embodiment 1 was described above. According to Embodiment 1, the following advantageous effects can be achieved.

Since the data distribution permission management processing is performed by the data distribution device 100, distribution of data DTA to a user is suspended when the user fails to register the derived data generation history information 420 in the history management database 400. Thus, when data DTA are made use of for generation of derived data DTB by a user, the user is prompted to register the derived data generation history information 420 in the history management database 400. As a result, the provider of data DTA is able to grasp whether or not distributed data DTA are effectively made use of according to whether or not the derived data generation history information 420 is registered in the history management database 400.

In addition, when distributed data DTA are not made use of for generation of derived data DTB, the distribution of data DTA to the user is automatically suspended since no derived data generation history information 420 is registered in the history management database 400. In this way, the provider of data DTA is able to suspend distribution of data DTA that has a low possibility of being effectively made use of. This advantageous effect contributes to prevention of leakage of data DTA.

In addition, in the derived data generation history information 420 that is registered in the history management database 400 when derived data DTB is generated by a user, the used data identification information (e) that identifies the data distribution history information 410 related to data DTA used for generation of the derived data DTB is included. Therefore, it is possible to, with respect to each piece of derived data DTB, properly manage a history representing which data DTA are used for generation of the derived data DTB in the history management database 400.

In addition, when, using data DTA and parent derived data that are derived data DTB generated in the past, child derived data that are derived data DTB different from the parent derived data are generated by a user, the parent derived data identification information (0 identifying the derived data generation history information $420\_k-1$ related to the parent derived data is included in the derived data generation history information $420\_k$ related to the child derived data. Therefore, it is possible to, with respect to each piece of derived data DTB, properly manage a history representing from which parent derived data the derived data DTB are derived in the history management database 400.

In addition, every time distribution of a set of data DTA from the data distributor 110 to a user is finished, the data distribution history information 410 serving as a proof certifying that the data DTA are distributed to the user is registered in the history management database 400. Therefore, it is possible to properly manage a history representing to which user each set of data DTA is transferred in the history management database 400.

In addition, in the data distribution history information $410\_j$ related to the current set of data DTA, the last data identification information (E) identifying the data distribution history information $410\_j-1$ related to the last set of data DTA is included. Therefore, it is possible to properly manage a local chronological precedence/succession relationship and a broader relationship of a series of links of a plurality of pieces of data DTA constituting a streaming data group in the history management database 400.

Embodiment 2

In Embodiment 1 described above, it was configured such that when a set of data DTA constituting a streaming data group is prepared by the provider, a copy of the set of data DTA is distributed to the first to third users as it is. In other words, data DTA that are distributed to the first to third users when a set of data DTA is prepared are the same as one another.

In contrast, it may be configured such that data DTA that, although having essentially the same content as one another, are different in form from one another are distributed to the first to third users. A specific example of the configuration is described below.

Figure 9:
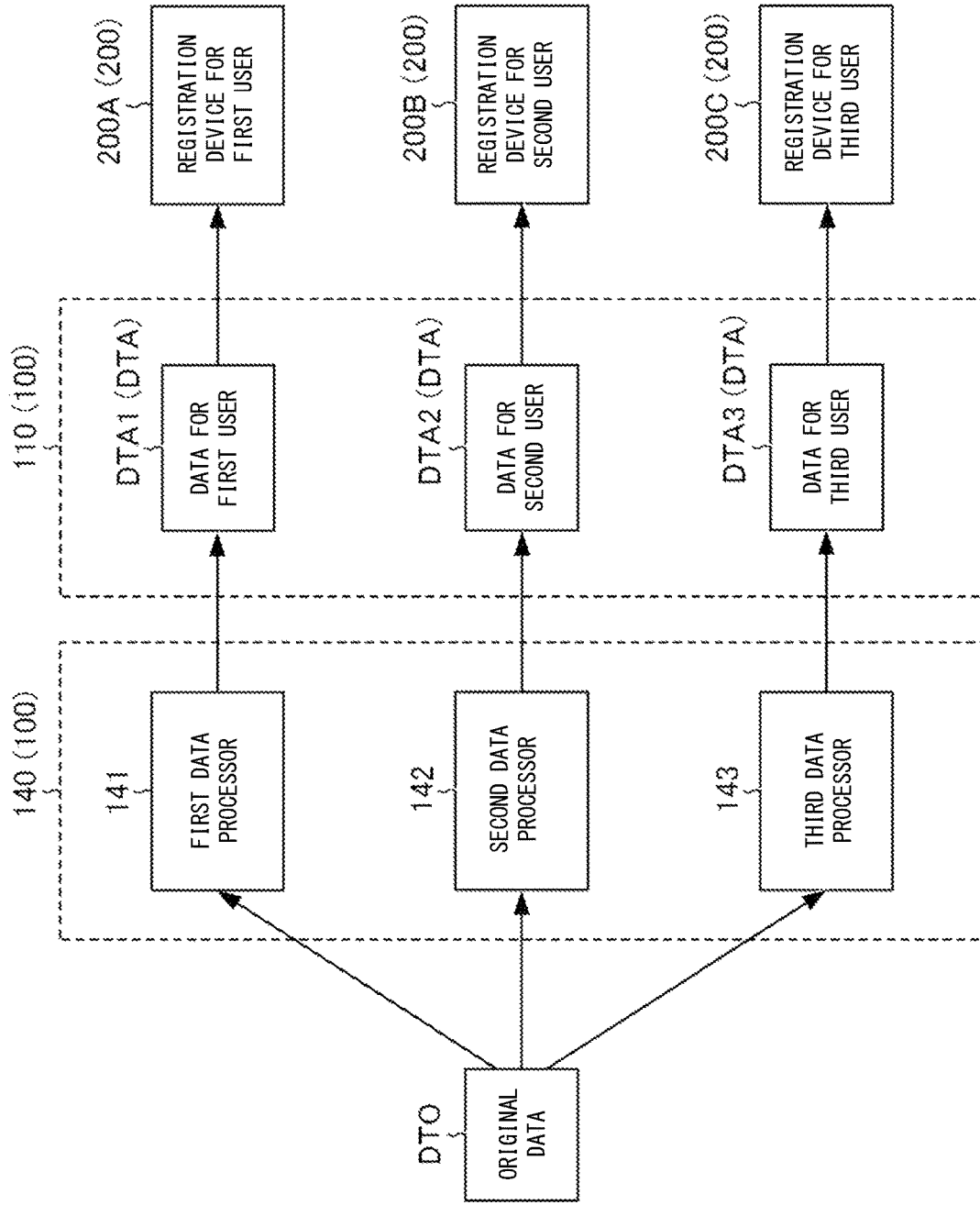
FIG. 9 is a conceptual diagram illustrating a configuration of a data processor according to Embodiment 2.

As illustrated in FIG. 9, a data distribution device 100 according to the present embodiment further includes a data processor 140 to perform data processing execution processing of generating data DTA that are different with respect to each user, using original data DTO serving as a source of the data DTA. Note that, in FIG. 9, to facilitate understanding, illustration of a communication line CL interposed between a data distributor 110 and registration devices 200 for user is omitted.

The data processor 140, by copying a common set of original data DTO to a number of sets, the number being equal to the number of users, that is, three sets in the present embodiment, of original data DTO, prepares original data for each user and, by subjecting each piece of original data DTO that are prepared for each user to data processing unique to the user, generates data DTA that are different with respect to each user. The data DTA generated for each user in this way are distributed to a corresponding user by the data distributor 110.

Specifically, the data processor 140 includes a first data processor 141, a second data processor 142, and a third data processor 143.

The first data processor 141, by subjecting original data DTO copied for a first user to data processing unique to the first user, generates data DTA1 for first user to be distributed to the first user. The data DTA1 for first user are distributed to a registration device 200A for first user of the first user by the data distributor 110.

The second data processor 142, by subjecting original data DTO copied for a second user to data processing unique to the second user, generates data DTA2 for second user to be distributed to the second user. The data DTA2 for second user are distributed to a registration device 200B for second user of the second user by the data distributor 110.

The third data processor 143, by subjecting original data DTO copied for a third user to data processing unique to the third user, generates data DTA3 for third user to be distributed to the third user. The data DTA3 for third user are distributed to a registration device 200C for third user of the third user by the data distributor 110.

A specific example of data processing that the data processor 140 executes is described below. The original data DTO include fishing data in which geographic data at a plurality of points each of which represents a point on the ocean at which fishing was performed and fish catch at each point are associated with each other. The geographic data are data representing a latitude and longitude of each point.

In this case, the data processing that the data processor 140 executes means an operation of slightly shifting the latitude and longitude of each point that the geographic data represent within a range that is allowable as an error. A shift method in the operation, specifically a combination of a shift amount of latitude and a shift amount of longitude, which represent a shift amount as a vector, is differentiated among the first to third users.

That is, the data DTA1 to DTA3 for first to third users that are results of performing the operation of shifting the geographic data with respect to the fishing data in the original data DTO, although having the same fishing data as one another, have slightly different geographic data from one another. Thus, the geographic data and the users correspond to each other in a one-to-one manner. Therefore, the data DTA and the users correspond to each other in a one-to-one manner.

In addition, as already described, in data distribution history information 410 registered in a history management database 400 illustrated in FIG. 1, data identification information (C) identifying data DTA distributed to a user is included. The data identification information (C) has a content that distinguishes each of the data DTA1 to DTA3 for first to third users from the others.

Thus, a proof indicating which of the data DTA1 to DTA3 for first to third users are distributed to each of the first to third users is accumulated in the history management database 400 as the data distribution history information 410.

Therefore, according to the present embodiment, when one of the first to third users is supposed to have leaked data DTA, a provider can identify which of the first to third users leaked the data DTA, using the leaked data DTA.

Specifically, the provider calculates data identification information (C) by a hash value or the like of the leaked data DTA and extracts data distribution history information 410 that includes the data identification information (C) from the history management database 400. Then, the provider is able to identify which of the first to third users an acquirer of the data DTA is by acquirer identification information (B) included in the extracted data distribution history information 410. Since data DTA and the acquirer of the data DTA correspond to each other in a one-to-one manner, the provider is able to identify which of the first to third users leaked the data DTA.

As described above, according to the present embodiment, when a user is supposed to have leaked data DTA, the user is identified. Thus, it is possible to prevent data DTA from being leaked by a user. The other configuration and advantageous effects are the same as those in Embodiment 1.

Embodiment 3

The data distribution system 300 according to Embodiment 1 illustrated in FIG. 1 may further include a configuration in which every time data DTA are distributed to a user or every time derived data DTB generated by a user are sold, the price of the data DTA is charged to the user by the provider. A specific example of the configuration is described below.

Figure 10:
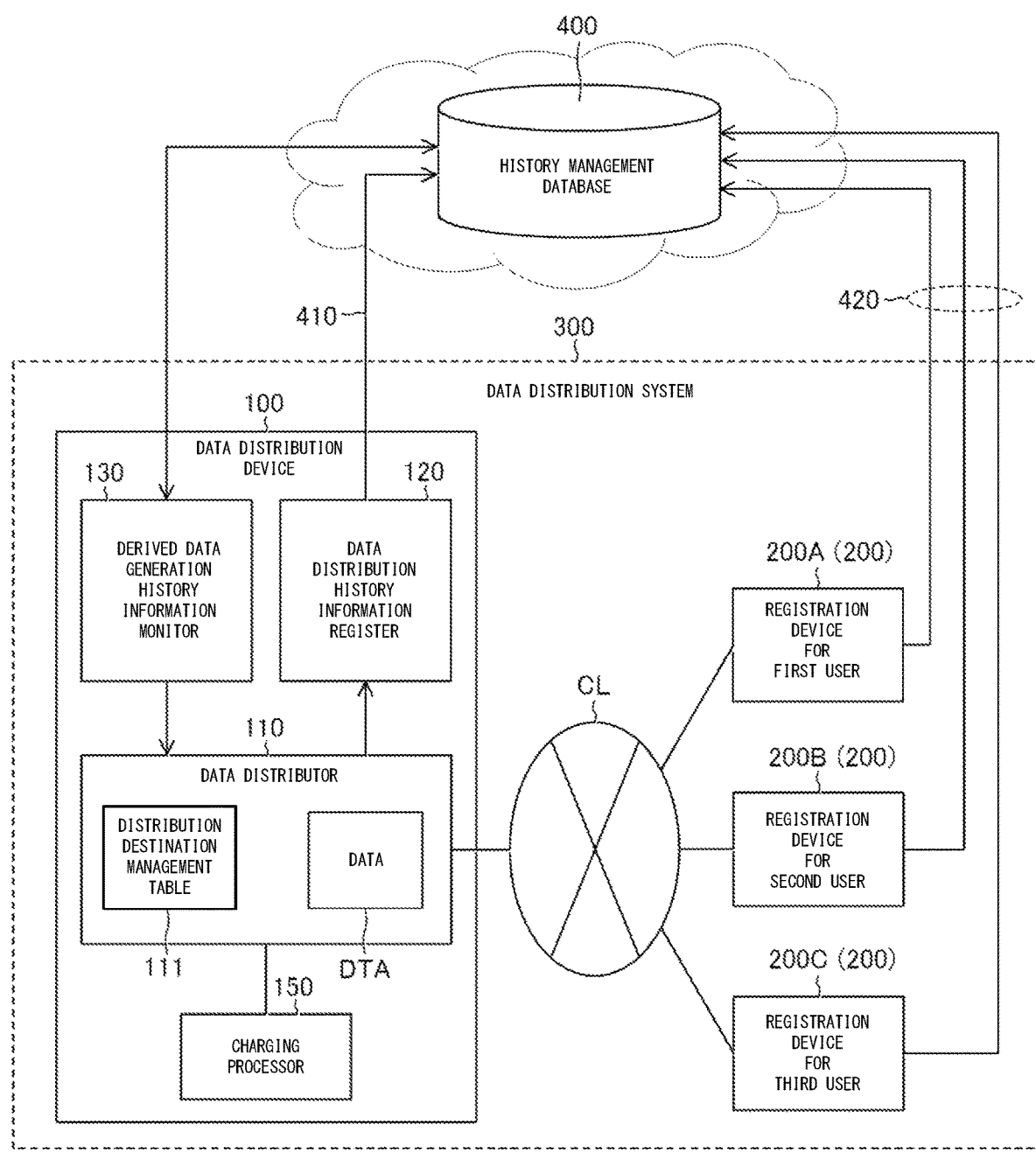
FIG. 10 is a conceptual diagram illustrating a configuration of a data distribution system according to Embodiment 3.

As illustrated in FIG. 10, a data distribution device 100 according to the present embodiment further includes a charging processor 150 to perform charging processing of charging the price of data DTA to a user. The charging processing specifically means processing of transmitting, to a server of a financial institution that manages a financial institution account of a user, a request to debit the price of data DTA from the account of the user and receiving confirmation of the debit from the server.

When distribution of data DTA from the data distributor 110 to a user is finished, the charging processor 150 performs charging processing of charging the price of the data DTA to the user. In this case, in data distribution history information 410, charging completion information indicating that charging of the price of distributed data DTA is completed may be included.

In addition, when the data distributor 110 acquires, from a registration device 200 for user of a user who generated derived data DTB using data DTA, sales report information indicating that the derived data DTB was sold, the charging processor 150 performs charging processing of charging the price of the data DTA to the user.

In this case, the charging processor 150 may, in advance of charging processing, access derived data generation history information 420 accumulated in the history management database 400, confirm that the generator of the derived data DTB is definitely the user by generator identification information (a), derived data identification information (b), and an electronic signature (d) of the generator, and confirm that the data DTA was definitely used for generation of the derived data DTB by used data identification information (e).

Embodiment 4

The history management database 400 illustrated in FIG. 1 may be a blockchain. Note that, in the description of the present disclosure, the "database" means a set of data that is electronically stored and can be electronically accessed and is assumed to be a concept in which a blockchain is also included.

When a history management database 400 is a blockchain, for example, a transaction to register data distribution history information 410, a transaction to register derived data generation history information 420, and the like may be respectively broadcast to each node, grouped into one or a plurality of blocks, and registered in the blockchain.

A specific example of a case where the history management database 400 is a blockchain is described below. Note that, as a platform of the blockchain, Ethereum (registered trademark) is described as an example. In the following description of the present embodiment, the history management database 400 functioning as a blockchain is simply referred to as a blockchain 400.

Figure 11:
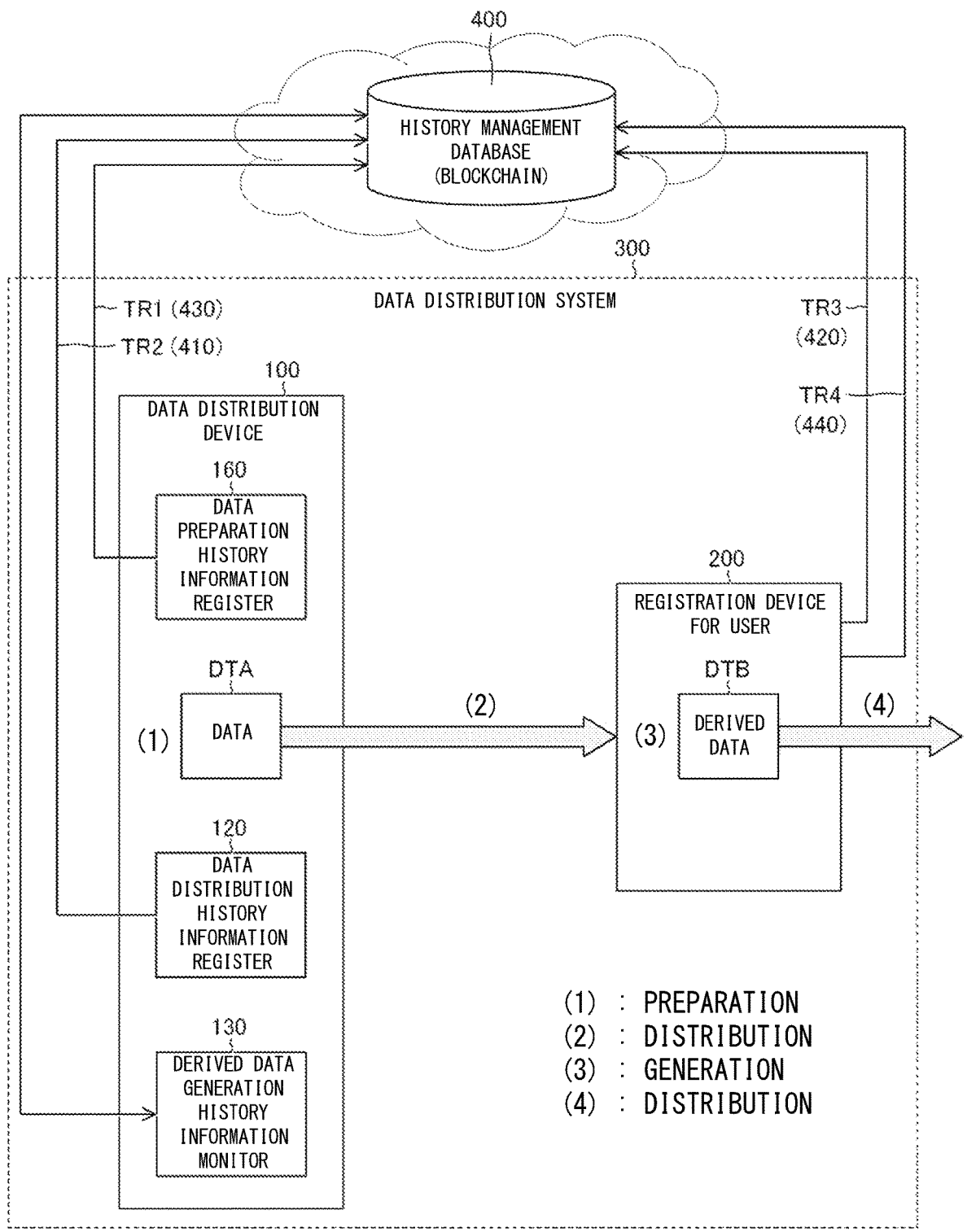
FIG. 11 is a conceptual diagram illustrating a configuration of a data distribution system according to Embodiment 4.

As illustrated in FIG. 11, in the present embodiment, (1) at a stage when data DTA are prepared in a distributable manner, (2) at a stage when the data DTA are distributed, (3) at a stage when derived data DTB are generated, and (4) at a stage when the derived data DTB are distributed, transactions TR1, TR2, TR3, and TR4 are published on the blockchain 400, respectively. Each stage is specifically described below.

(1) First, in a data distribution device 100, every time a set of data DTA is prepared by the provider in a state of being distributable to users, the transaction TR1 is published on the blockchain 400. The data distribution device 100 according to the present embodiment includes a data preparation history information register 160 to publish a transaction TR.

That is, the data preparation history information register 160 publishes the transaction TR1 that requests verification that the data DTA are prepared by the provider on the blockchain 400. The published transaction TR1 is verified by miners on the blockchain 400. In other words, it is verified that the data DTA are properly prepared by the provider. Note that a miner who first performed the verification acquires a block reward, specifically, Gas on Ethereum (registered trademark).

Specifically, in the transaction TR1, a plain text representing a content to be authenticated and an electronic signature generated by encrypting the plain text with a secret key of the provider are included. The verification by miners means confirmation of coincidence between the plain text included in the transaction TR1 and information into which the electronic signature included in the transaction TR1 is decrypted with a public key. The same applies to the transactions TR2 to TR4, which are described later.

A content of the verified transaction TR1 is confirmed on the blockchain 400 as data preparation history information 430 that is a non-fungible token (NFT) by a smart contract stored on the blockchain 400. Note that a non-fungible token conforms to standard ERC-71.

In a manner as described above, every time a set of data DTA is prepared by the provider in a state of being distributable to users, the data preparation history information register 160 performs data preparation history information registration processing of registering the data preparation history information 430 on the blockchain 400 indirectly through publishing the transaction TR1. The data preparation history information 430 is information that proves that the data DTA are prepared by the provider, that is, that the generator of the data is the provider.

(2) Next, every time distribution of a set of data DTA from the data distribution device 100 to a user is finished, a data distribution history information register 120 publishes a transaction TR2 on the blockchain 400.

The transaction TR2 includes an electronic signature of the provider who provides data DTA and an electronic signature of a user who receives the data DTA and is a transaction that requests verification that distribution of the data DTA from the provider to the user is finished.

The published transaction TR2 is verified by miners on the blockchain 400. In other words, it is verified that the data DTA are properly distributed from the provider to the user. Note that a miner who first performed the verification acquires a block reward.

A content of the verified transaction TR2 is confirmed on the blockchain 400 as the already described data distribution history information 410 that is a non-fungible token by a smart contract stored on the blockchain 400.

In a manner as described above, every time distribution of a set of data DTA from the provider to a user is finished, the data distribution history information register 120 registers the already described data distribution history information 410 on the blockchain 400 indirectly through publishing the transaction TR2. The data distribution history information 410 is information that proves that the data DTA are properly distributed from the provider to the user.

(3) Next, every time derived data DTB are generated by a user using data DTA, a registration device 200 for user publishes a transaction TR3 on the blockchain 400.

The transaction TR3 includes an electronic signature of a user who generated derived data DTB and is a transaction that requests verification that the derived data DTB are generated by the user. The published transaction TR3 is verified by miners on the blockchain 400. In other words, it is verified that the derived data DTB are generated by the user. Note that a miner who first performed the verification acquires a block reward.

A content of the verified transaction TR3 is confirmed on the blockchain 400 as the already described derived data generation history information 420 that is a non-fungible token by a smart contract stored on the blockchain 400.

In a manner as described above, every time derived data DTB are generated by a user, the registration device 200 for user registers the already described derived data generation history information 420 on the blockchain 400 indirectly through publishing the transaction TR3. The derived data generation history information 420 is information that proves that the derived data DTB are generated by the user.

(4) Next, every time derived data DTB generated by a user are distributed to the outside, a registration device 200 for user publishes a transaction TR4 on the blockchain 400. As used herein, the "outside" specifically means a not-illustrated device other than the data distribution device 100 and the registration devices 200 for user.

The transaction TR4 includes an electronic signature of a user who distributes the derived data DTB and an electronic signature of an acquirer who acquires the derived data DTB and is a transaction that requests verification that distribution of the derived data DTB to the outside is performed.

The published transaction TR4 is verified by miners on the blockchain 400. In other words, it is verified that the derived data DTB are distributed to the outside. Note that a miner who first performed the verification acquires a block reward.

A content of the verified transaction TR4 is confirmed on the blockchain 400 as derived data distribution history information 440 that is a non-fungible token by a smart contract stored on the blockchain 400.

In a manner as described above, every time derived data DTB are distributed to the outside, the registration device 200 for user registers the derived data distribution history information 440 on the blockchain 400 indirectly through publishing the transaction TR4. The derived data distribution history information 440 is information that proves that the derived data DTB are distributed to the outside.

Embodiments 1 to 4 were described above. Variations described below are also applicable.

In Embodiment 1, assuming that derived data DTB are generated with respect to each set of data DTA, a case where the "predetermined timing" illustrated in step S21 in FIG. 6 is a point in time at which a period required for derived data generation has elapsed from a point in time at which distribution of a set of data DTA to a user was finished most recently was exemplarily described. On the other hand, derived data DTB may be generated using a plurality of sets of data DTA, and, in such a case, the "predetermined timing" may be a point in time at which, for example, three days, as the period required for derived data generation, have elapsed from a point in time at which distribution of a plurality of sets, for example, three sets, of data DTA to a user was finished most recently.

Although, in Embodiments 1 to 3, a case where the number of users who use data DTA is three, namely the first to third users, was exemplarily described, the number of users may be one or four or more. In addition, as already described, a user may include a plurality of persons. For example, a distribution company that actually performs distribution of data DTA using the data distribution device 100 may be a company that is entrusted with data distribution by a preparation company that prepares the data DTA, and, even in such a case, the distribution company and the preparation company are collectively referred to as "provider".

In Embodiment 1, a case where data DTA serving as training data illustrated in FIG. 2 are fishing data in which data representing ocean conditions at the time of fishing and data representing fish catch under the ocean conditions are associated with each other and derived data DTB are a trained model for determining possibility/impossibility of fishing or estimating fish catch was exemplarily described. A combination of data DTA serving as training data and derived data DTB serving as a trained model is not limited to the above-described example. For example, data DTA may be engine state data in which data representing various types of physical quantities in an engine that is in an operation state and data representing health of the engine in the operation state are associated with each other, and derived data DTB may be a trained model for performing determination of health of the engine.

In addition, derived data DTB is not limited particularly to a trained model and may be application software other than a trained model that is generated using data DTA as a resource.

By installing the data distribution program 100c illustrated in FIG. 8 in an existing computer, such as a smartphone, a tablet, or other like, it is possible to cause the computer to achieve the functions of the data distribution device 100. The data distribution program 100c can be distributed via a communication line or distributed by storing the data distribution program 100c in a non-transitory recording medium.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A data distribution system comprising:
   a data distribution device including at least one processor to perform data distribution processing of distributing a plurality of sets of data that has contents different from one another to a user one set of the data at a time intermittently at intervals; and
   a registration device for user to, every time the data are distributed to the user in the data distribution processing and derived data that are obtained using the data are generated by the user, register derived data generation history information indicating that the derived data are generated by the user in a history management database for managing a history of use of the data, wherein
   the at least one processor performs, at a predetermined timing, data distribution permission management processing of examining whether or not the derived data generation history information is registered in the history management database and, when the derived data generation history information is not registered in the history management database, suspending distribution of the data to the user in the data distribution processing.

2. The data distribution system according to claim 1, wherein the at least one processor further performs, every time distribution of a set of the data to the user in the data distribution processing is finished, data distribution history information registration processing of registering data distribution history information indicating that distribution of the data to the user is finished in the history management database.

3. The data distribution system according to claim 2, wherein
   the data distribution history information includes
      provider identification information identifying a provider who prepared the data,
      acquirer identification information identifying an acquirer who is the user who received distribution of the data,
      data identification information identifying the data, and
      an electronic signature of the provider and an electronic signature of the acquirer for certifying that the data are distributed from the provider to the acquirer.

4. The data distribution system according to claim 2, wherein
   the history management database is achieved by a blockchain,
   the at least one processor publishes, in the data distribution history information registration processing, a transaction that requests verification that distribution of the data to the user is finished on the blockchain, and
   the published transaction is verified by miners on the blockchain and a content of the verified transaction is confirmed on the blockchain as the data distribution history information that is a non-fungible token by a smart contract stored on the blockchain.

5. The data distribution system according to claim 2, wherein
   the derived data generation history information includes generator identification information identifying a generator who is the user who generated the derived data,
derived data identification information identifying the derived data,
an electronic signature of the generator for certifying that the generator generated the derived data, and
used data identification information identifying the data distribution history information indicating that the data used for generation of the derived data are distributed to the generator in the history management database.

6. The data distribution system according to claim 1, wherein
using the data distributed to the user in the data distribution processing and parent derived data that are the derived data generated in a past, child derived data that are the derived data different from the parent derived data are generated by the generator, and
in the derived data generation history information related to the child derived data, parent derived data identification information identifying the derived data generation history information indicating that the parent derived data used for generation of the child derived data are generated in the history management database is included.

7. The data distribution system according to claim 1, wherein
the history management database is achieved by a blockchain,
the registration device for user publishes a transaction that requests verification that the derived data are generated by the user on the blockchain, and
the published transaction is verified by miners on the blockchain and a content of the verified transaction is confirmed on the blockchain as the derived data generation history information that is a non-fungible token by a smart contract stored on the blockchain.

8. The data distribution system according to claim 1, wherein
the history management database is achieved by a blockchain,
every time the derived data generated by the user are distributed to an outside, the registration device for user publishes a transaction that requests verification that distribution of the derived data is performed on the blockchain, and
the published transaction is verified by miners on the blockchain and a content of the verified transaction is confirmed on the blockchain as the derived data distribution history information that is a non-fungible token by a smart contract stored on the blockchain.

9. The data distribution system according to claim 1, wherein
the history management database is achieved by a blockchain,
the at least one processor further performs, every time a set of the data is prepared by a provider in a state of being distributable to the user, data preparation history information registration processing of registering data preparation history information indicating that the data are prepared by the provider in the history management database,
the at least one processor publishes, in the data preparation history information registration processing, a transaction that requests verification that the data are prepared by the provider on the blockchain, and
the published transaction is verified by miners on the blockchain and a content of the verified transaction is confirmed on the blockchain as the data preparation history information that is a non-fungible token by a smart contract stored on the blockchain.

10. The data distribution system according to claim 1, wherein
the at least one processor further performs data processing execution processing of, by copying a common set of original data to a number of sets, the number being equal to a number of users, of the original data, preparing the original data for each of the users and, by subjecting each piece of the original data that are prepared for each of the users to data processing unique to the user, generating the data that are different with respect to each of the users, and
in the data distribution processing, the data generated for each of the users in the data processing execution processing are distributed to the corresponding user.

11. The data distribution system according to claim 1, wherein the at least one processor further performs, when distribution of the data to the user in the data distribution processing is finished or when, from the user who generated the derived data using the data, sales report information indicating that the derived data are sold is acquired, charging processing of charging a price of the data to the user.

12. A data distribution device comprising:
at least one processor to perform
data distribution processing of distributing a plurality of sets of data that has contents different from one another to a user one set of the data at a time intermittently at intervals, and
data distribution permission management processing of accessing a history management database that is a history management database for managing a history of use of the data and in which every time the data are distributed to the user in the data distribution processing and derived data that are obtained using the data are generated by the user, derived data generation history information indicating that the derived data are generated by the user is registered, wherein
the data distribution permission management processing includes examining, at a predetermined timing, whether or not the derived data generation history information is registered in the history management database and, when the derived data generation history information is not registered in the history management database, suspending distribution of the data to the user in the data distribution processing.

13. A non-transitory recording medium storing a data distribution program causing a computer to execute:
distributing a plurality of sets of data that has contents different from one another to a user one set of the data at a time intermittently at intervals; and
accessing, at a predetermined timing, a history management database that is a history management database for managing a history of use of the data and in which every time the data are distributed to the user by a data distribution function and derived data that are obtained using the data are generated by the user, derived data generation history information indicating that the derived data are generated by the user is registered, examining whether or not the derived data generation history information is registered in the history management database, and, when the derived data generation history information is not registered in the history management database, suspending subsequent distribution of the data to the user by the data distribution function.

14. A data distribution method comprising:

distributing, by a data distribution device, a plurality of sets of data that has contents different from one another to a user one set of the data at a time intermittently at intervals;

registering, by a registration device for user, every time the data are distributed from the data distribution device to the user and derived data that are obtained using the data are generated by the user, derived data generation history information indicating that the derived data are generated by the user in a history management database for managing a history of use of the data; and examining, by the data distribution device, at a predetermined timing, whether or not the derived data generation history information is registered in the history management database and, when the derived data generation history information is not registered in the history management database, suspending subsequent distribution of the data to the user.

* * * * *